(12) United States Patent
Ingimundarson et al.

(10) Patent No.: US 11,182,167 B2
(45) Date of Patent: Nov. 23, 2021

(54) METHOD TO DETERMINE THE OLDEST INSTRUCTION IN AN INSTRUCTION QUEUE OF A PROCESSOR WITH MULTIPLE INSTRUCTION THREADS

(71) Applicant: INTERNATIONAL BUSINESS MACHINES CORPORATION, Armonk, NY (US)

(72) Inventors: Arni Ingimundarson, Karlsruhe (DE); Maarten J. Boersma, Holzgerlingen (DE); Niels Fricke, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/354,697

(22) Filed: Mar. 15, 2019

(65) Prior Publication Data

US 2020/0293328 A1    Sep. 17, 2020

(51) Int. Cl.
   *G06F 9/38*         (2018.01)
(52) U.S. Cl.
   CPC .......... *G06F 9/3851* (2013.01); *G06F 9/3855* (2013.01)
(58) Field of Classification Search
   CPC ..... G06F 9/3836; G06F 9/3851; G06F 9/3855
   See application file for complete search history.

(56) References Cited

U.S. PATENT DOCUMENTS

| | | | |
|---|---|---|---|
| 5,805,849 A * | 9/1998 | Jordan | G06F 9/3836 712/214 |
| 8,635,436 B2 | 1/2014 | Indukuru et al. | |
| 9,367,322 B1 | 6/2016 | Brownscheidle et al. | |
| 2009/0138682 A1* | 5/2009 | Capps, Jr. | G06F 11/3466 712/220 |
| 2015/0106595 A1* | 4/2015 | Khot | G06F 9/3851 712/215 |
| 2016/0364239 A1 | 12/2016 | Lechenko et al. | |
| 2016/0378502 A1 | 12/2016 | Burger et al. | |

(Continued)

FOREIGN PATENT DOCUMENTS

WO    2015145191 A1    10/2015

OTHER PUBLICATIONS

Latorre et al., "CROB: Implementing a Large Instruction Window Through Compression," Transactions on HiPEAC III, 2011, p. 115-134, LNCS vol. 6590, Springer-Verlag, Berlin, Heidelberg.

(Continued)

*Primary Examiner* — William B Partridge
*Assistant Examiner* — Kasim Alli
(74) *Attorney, Agent, or Firm* — Kristofer L. Haggerty

(57) ABSTRACT

A method to determine an oldest instruction in an instruction queue of a processor with multiple instruction threads, wherein each of the multiple instruction threads have a unique thread identifier. The method includes tagging each instruction thread, of the multiple instruction threads, in the instruction queue with a unique tag number according to a round-robin scheme, wherein the unique tag number includes the unique thread identifier for each instruction thread and a round number in the round-robin scheme. The method further includes selecting, for each instruction thread, of the multiple instruction threads, the instruction thread with a lowest tag number from the multiple instruction threads in the instruction queue that are tagged with an oldest round number from the round-robin scheme.

14 Claims, 5 Drawing Sheets

(56) References Cited

U.S. PATENT DOCUMENTS

| | | |
|---|---|---|
| 2017/0090941 A1 | 3/2017 | Eisen et al. |
| 2018/0004516 A1* | 1/2018 | Feiste .................. G06F 9/3861 |

OTHER PUBLICATIONS

Mell et al., "The NIST Definition of Cloud Computing," National Institute of Standards and Technology, Sep. 2011, p. 1-3, Special Publication 800-145.

* cited by examiner

METHOD TO DETERMINE THE OLDEST INSTRUCTION IN AN INSTRUCTION QUEUE OF A PROCESSOR WITH MULTIPLE INSTRUCTION THREADS

BACKGROUND

The present disclosure relates to the field of digital computer systems, and more specifically, to a method to determine the oldest instruction in an instruction queue of a processor with multiple instruction threads.

The execution of instructions in an out-of-order mode by a multi-threading computer core requires tracking the correct order of the instructions. However, there is a need to improve the techniques for tracking the order of the instructions.

SUMMARY

Embodiments of the present invention disclose a method, a computer program product, and a system.

A method, according to an embodiment of the invention, in a data processing system including a processor and a memory, to determine the oldest instruction in an instruction queue of a processor with multiple instruction threads, wherein the threads have a unique thread identifier. The method comprises tagging each instruction thread, of the multiple instruction threads, in the instruction queue with a unique tag number according to a round-robin scheme, wherein the unique tag number includes the unique thread identifier for each instruction thread and a round number in the round-robin scheme. The method further includes selecting, for each of the multiple instruction threads, the instruction thread with a lowest tag number from the multiple instruction threads in the instruction queue that are tagged with an oldest round number from the round-robin scheme.

A computer program product, according to an embodiment of the invention, includes a non-transitory tangible storage device having program code embodied therewith. The program code is executable by a processor of a computer to perform a method to determine the oldest instruction in an instruction queue of a processor with multiple instruction threads, wherein the threads have a unique thread identifier. The method includes tagging each instruction thread, of the multiple instruction threads, in the instruction queue with a unique tag number according to a round-robin scheme, wherein the unique tag number includes the unique thread identifier for each instruction thread and a round number in the round-robin scheme. The method further includes selecting, for each of the multiple instruction threads, the instruction thread with a lowest tag number from the multiple instruction threads in the instruction queue that are tagged with an oldest round number from the round-robin scheme.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method to determine the oldest instruction in an instruction queue of a processor with multiple instruction threads, wherein the threads have a unique thread identifier. The method includes tagging each instruction thread, of the multiple instruction threads, in the instruction queue with a unique tag number according to a round-robin scheme, wherein the unique tag number includes the unique thread identifier for each instruction thread and a round number in the round-robin scheme. The method further includes selecting, for each of the multiple instruction threads, the instruction thread with a lowest tag number from the multiple instruction threads in the instruction queue that are tagged with an oldest round number from the round-robin scheme.

BRIEF DESCRIPTION OF THE SEVERAL VIEWS OF THE DRAWINGS

In the following embodiments the invention is explained in greater detail, by way of example only, making reference to the drawings in which.

DETAILED DESCRIPTION

Figure 1:
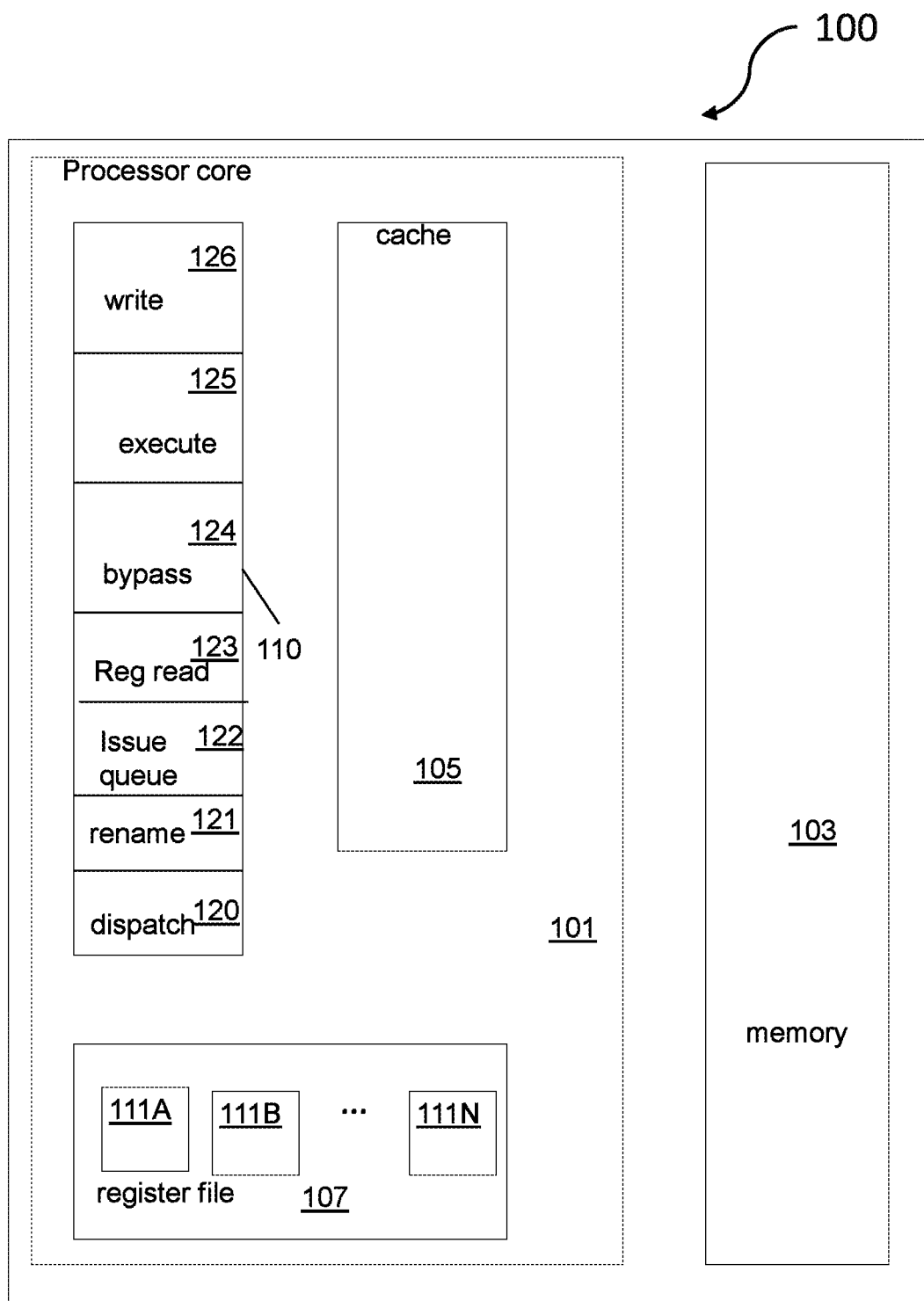
FIG. 1 depicts an example multiprocessor system, in accordance with embodiments of the present disclosure.

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

Finding the oldest instruction in a processor queue using a fixed bit width numbering scheme (e.g., instruction tag (ITAG)) that works in a round-robin principle may not be done by a simple 'less than compare' because the compare logic needs to distinguish between the several rounds. Using a fixed bit width numbering scheme that works in a round-robin principle, therefore, is solved by using an extra 'round bit' of the ITAG. The result of the 'less than compare' needs to be flipped if the 'round bit' or 'flip bit' of two instructions, that are compared, are different. This is because if the 'round bit' or 'flip bit' of two instructions, that are compared, are different indicates that the younger instruction is from the next round. This flipping of the 'less than compare' may be an extra logic delay which may further be improved as described herein.

With the present disclosure, the flipping of the 'less than compare' result may be avoided by manipulating the 'round bit' and adding it to the 'less than compare'. The manipulating which is done in a previous cycle can be done based on an ITAG of a 'next to complete' instruction, which basically defines where the current round begins. An additional complexity in a multi-threading machine is that only instruction tags of the same thread can be compared. Comparisons of instructions of different threads may be invalid. Thus, the thread ID is included in the instruction tag which is used for the 'less than compare'. In the present disclosure, the thread ID is converted, prior to the 'less than compare', to a 'prioritized thread id' which enables comparison of instructions from different threads and reduces the complexity and delay to find the oldest instruction (e.g., in an instruction age table).

The present disclosure may simplify the process to find the oldest instruction using an ITAG scheme described herein while respecting the given thread priority constraints. For example, a search algorithm and circuitry may be used to find the oldest instruction ITAG for each of the threads (e.g., the search circuitry may be shared among all threads). Additionally, a comparison of ITAGs within one thread and comparisons between threads may be merged. For example, if a highest prioritized thread has nothing, automatically fall back to the next thread, etc.

According to one embodiment, the unique tag number is a value of a set of bits, wherein the unique thread identifier is a value of a first subset of bits of the set of bits and the round number is a value of a remaining second subset of bits of the set of bits. The second subset of bits is subsequent and adjacent to the first subset of bits.

For example, ITAGs may be provided in ascending order and may consist of the second subset of bits ITAG<0:K>, with bit ITAG<0> defined as the most significant bit (round bit) and the first subset bits (or thread ID bits) TID<0:L>. In this case, the tag number (ITAG_FOR_COMPARE) may be defined as follows ITAG_FOR_COMPARE=TID<0:L>∥ITAG<0>∥ITAG<1:K>, with TID<0:L> being an image of the TID values used only for ITAG age comparison that orders the threads by assigning the lowest absolute value to the most prioritized thread. The advantage of using this rearrangement is that the logic searching for the oldest ITAG can do so by simply comparing the absolute values of the ITAGs_FOR_COMPARE. The TID bits need no special care by that logic as they have already been encoded into a new and comparable value according to a current thread priority. This may simplify the implementation of finding the oldest ITAG given a thread priority. By separating the thread priority handling from the age comparison a VHDL/circuit implementation can be cleaner, more readable and therefore better maintainable. This scheme may also enable the option to easily implement different kinds of thread priority rules just by changing the function manipulating the values of TID. The TID manipulation logic can also be executed one clock cycle prior to the age comparison and thereby reduce the size of that logic and enable higher clock speed or more relaxed physical designs.

The selection of the instruction with the lowest tag number may be performed using the values of the set of bits. In one example, the values of the set of bits (i.e., tag number) may need to be updated or changed as described below. In this case, the selection of the instruction with the lowest tag number may use the updated values of the set of bits (updated tag numbers). In one example, the updated or changed values (and optionally the original value) of the set of bits may be provided as a copy (e.g., having a version) of the set of bits. The selection of the lowest tag number may be performed using the copy of the set of bits. This may enable to use the original values of the set of bits for other purposes (e.g., using an existing tag numbers manipulation method).

According to one embodiment, the method further comprises in response to determining that a priority of the threads have changed, updating the unique tag number by changing the value of the first subset of bits in accordance with a current priority for each of the multiple instruction threads for performing the selection. This may provide accurate and up-to-date processing of instructions.

The updating may, for example, be performed for assigning the lowest absolute value of the first subset of bits to the most prioritized thread. For example, a thread priority function may be used to update the TID bits (first subset of bits) depending on a current thread priority. Example implementations of the thread priority function are as follows:

1) TID<0:L>'=TID<0:L>+L+1-bit-rolling-counter modulo $2^{(L+1)}$. This may be a round robin priority with always the same order, just different starting points e.g., with 4 threads: 0 1 2 3 then, 1 2 3 0, then 2 3 0 1, etc.
2) TID<0:L>'=TID<0:L> XOR L+1-bit-rolling-counter. This may be a round robin priority with a bit twisted order e.g., 0 1 2 3, 1 0 3 2, 2 3 0 1, 3 2 1 0, 0 1 2 3.
3) TID<0:L>'=TID<0:L>XOR maximum-length-LFSR<x:x+L>. This may be a pseudo random order but with same long-term probability for each thread.
4) TID<0:L>'=select_permutation(TID<0:L>, permutation_counter). This may be a look-up-table based approach which can support higher long term probability to a certain thread.

In another example, the tag number may be updated for enabling the comparison as follows. According to one embodiment (first example), the method further comprises for each thread determining a next round number to be used in accordance with the round-robin scheme for tagging a new instruction of the instruction queue; if the value of the most significant bit (i.e., round bit) of the determined next round number is equal to one changing the round bit of each round number of the round numbers of each instruction thread, of the multiple instruction threads, in the instruction queue resulting in updated unique tag numbers, and using the updated unique tag numbers for the selection. If the value of the most significant bit (round bit) of the determined round number is equal to zero there may be no need to change the values of the round bits of the instructions. The determined round number may indicate where the current round begins.

If, for example, the second subset of bits, which is used to store values of the round numbers, is 2 bits long, the round numbers may be provided in the following ascending order 00, 01, 10, and 11 for each coming instruction. This set of 4 possible values of the second subset of bits defines a round. Once the round is completed, a next round may start again (e.g., 00, 01, 10 and 11 and so on). If for example, the last round number used to tag a last instruction is 10 (e.g., inst1 has round number 00, inst2 has round number 01 and inst3 has round number 10), the determined round number of this embodiment may be 11. Since the round bit of the determined round number is 1, all round bits of the round numbers that are existing are flipped. This, for example, results in the following round numbers 10, 11, 01 of the instructions inst1, inst2 and inst3 respectively.

In another second example, in order to enable the comparison of the tag numbers, the assigned round numbers may be updated or changed as follows. The value of the most significant bit of each round number may be changed using a correction function. The correction function may make the absolute manipulated ITAG value (round number) orderable. That is, the correction function may compensate for when the ITAG values wrap around to zero. For that, one requirement on the ITAG number pool may be made: only half of the number space can be used for active (or 'in-flight') ITAGs. One such mechanism is using the determined round number (e.g., all ITAGs older than this round number have completed and are no longer in the execution pipeline of the processor). Such determined round numbers may unambiguously indicate which of two ITAGs whose round bit differ is older. For example, if the round number (ITAG) has round bit=0, that means that all ITAGs with round bit=0 and have an absolute value smaller than the determined round number are not active in the system. And it means that all ITAGs whose round bit=1 are younger than ITAGs with round bit=0. If, in another example, the round number (ITAG) has round bit=1, that means that new ITAGs with ever increasing ITAG values will at one point 'roll-over' all to zeros. The ITAGs with round bit=0 are younger than ITAGs with round bit=1. Also, there can be no ITAGs with round bit=0 older than any ITAG with round bit=1 because the determined round number has a round bit=1, meaning all lower numbers beyond a 0b10000 boundary are completed.

By utilizing the determined round number of the first example (one per thread) the MSBit of all ITAGs can be corrected so that the absolute value always reflects the true relative age of two ITAGs. The correction function is: FLIP'=BIT1 XOR BIT2, where BIT1 is the round bit of the determined round number and BIT2 is the round bit of a given round number (ITAG). That is, the round bit of all ITAGs (in the corresponding thread) is inverted when the round bit of the determined round number is one.

The present method may always give the ITAG_FOR_COMPARE of the most prioritized thread the lowest absolute value both when looking only at the TID' bits and at the remaining bits describing the oldest ITAG within each thread, where the manipulated round bit guaranties that the oldest ITAG always has the lowest absolute value. Hence, the same simple comparison function may resolve both finding the oldest thread as well as finding the oldest ITAG within that thread.

FIG. 1 depicts an example processor system 100 in accordance with the present disclosure. The processor system 100 comprises at least one processor core (or processor) 101. The processor system 100 further comprises a main memory 103.

The processor core 101 may comprise a cache 105 associated with the processor core 101. The cache 105 is employed to buffer memory data in order to improve processor performance. The cache 105 is a high speed buffer holding cache lines of memory data that are likely to be used (e.g., cache 105 is configured to cache data of the main memory 103). Typical cache lines are 64, 128 or 256 bytes of memory data.

The processor core 101 may comprise an instruction execution pipeline 110. The execution pipeline 110 may include multiple pipeline stages, where each stage includes logic circuitry fabricated to perform operations of a specific stage in a multi-stage process needed to fully execute an instruction. Execution pipeline 110 may include a dispatch unit 120.

The dispatch unit 120 may be configured to fetch an instruction of the pipeline 110 and to decode the fetched instruction. Following the instruction fetch and decode, register operands of the instruction are renamed by rename unit 121. The renamed instruction may then be deposited in an issue queue (or issue window) 122, where the instruction waits for its source operands and an appropriate functional unit to become available. The issue queue 122 comprises a window logic which is responsible for monitoring dependencies between instructions in the window and issuing instructions to the functional units. The window logic comprises a wakeup logic and select logic. The wakeup logic is responsible for "waking up" (invoking) instructions waiting in the issue queue for their source operands to become available. Once an instruction is issued for execution, a tag corresponding to its result is broadcast to all the instructions in the window. Each instruction in the queue compares the tag with its source operand tags. Once all the source operands of an instruction are available the instruction is flagged ready for execution. The select logic is responsible for selecting instructions for execution from the pool of ready instructions. An instruction is said to be ready if all of its source operands are available. The operand values of the instruction are either fetched from a register file 107 by the register read unit 123 of the execution pipeline 110 or are bypassed from earlier instructions in the pipeline. The instruction is then issued and executes on one of the functional units of execution unit 125 of the execution pipeline 110 and results are bypassed from outputs to inputs by bypass unit 124 of the execution pipeline 110. Results of the execution may be stored either in memory 103, registers 111A-N or in other machine hardware (such as control registers) by the write unit 126.

The processor core 101 may further comprise the register file 107 comprising registers 111A-111N associated with the processor core 101. The registers 111A-N may for example be general purpose registers that each may include a certain number of bits to store data items processed by instructions executed in pipeline 110.

The source code of a program may be compiled into a series of machine-executable instructions defined in an instruction set architecture (ISA) associated with processor core 101. When processor core 101 starts to execute the executable instructions, these machine-executable instructions may be placed on pipeline 110 to be executed sequentially.

The instructions of the ISA may be provided to process data items stored in memory 103 and/or in registers 111A-N. For example, an instruction may retrieve a data item from the memory 103 to a register 111A-N. Rename unit 121 may retrieve data items to be processed from registers 111A-N. Execution unit 125 may include logic circuitry to execute instructions specified in the ISA of processor core 101. After execution of an instruction to process data items retrieved by rename unit 121, write unit 126 may output and store the results in registers 111A-N.

The processor core 101 may be configured to execute multiple processes or threads concurrently, supported by an operating system. Each instruction in the issue queue 122 may be assigned an instruction tag ITAG number before entering the issue queue 122 in accordance with an ITAG numbering scheme (e.g., a round-robin scheme). For example, the ITAG numbering scheme assigns 9 bit identification number to each instruction. The numbers are assigned sequentially in ascending order for each thread. This may result in each thread maintaining its own separate pool of ITAGs.

For example, to select the oldest ITAG in the queue, an age array may be used. The age array may be an NxN array where N is the number of entries (ITAGs) of the queue 122 to compare using a 'less than compare' logic.

Figure 2:
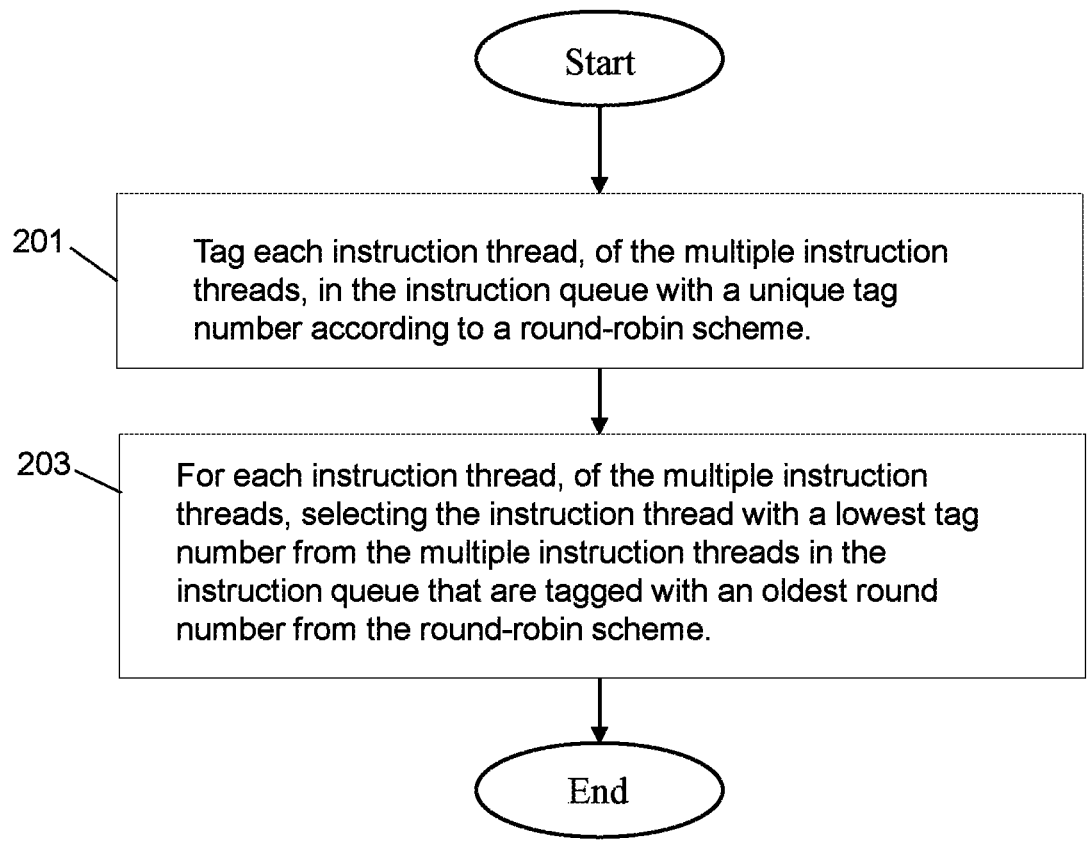
FIG. 2 depicts a flowchart to determine the oldest instruction in an instruction queue of a processor with multiple instruction threads, in accordance with embodiments of the present disclosure.

FIG. 2 depicts a flowchart of a method to determine the oldest instruction in an instruction queue of a processor with multiple instruction threads, in accordance with embodiments of the present disclosure. Each of the instructions threads has a unique thread identifier (TID).

In step 201, each instruction in the queue may be tagged with a unique tag number according to a round-robin scheme. The tag number includes the thread identifier for the instruction thread and the round number in the round-robin scheme.

For example, a set of N bits may be used to encode the unique tag number. The set of bits may be a concatenation of a first subset of bits TID<0:M> and a second subset of bits ITAG<M+1:N> as follows: TID<0:M>||ITAG<M+1:N>.

For each instruction thread, the instruction with the lowest tag number may be selected in step 203 from the multiple instruction threads in the instruction queue that are tagged with the oldest round number from the round-robin scheme.

For example, in step 203, the oldest (e.g., lowest) round number of each instruction thread may be identified using the second subset ITAG<M+1:N>. For example, if there are four threads, four values, ITAG1<M+1:N>, ITAG2<M+1:N>, ITAG3<M+1:N> and ITAG4<M+1:N> may be identified as being the oldest ones for the four threads. The unique tag numbers that comprise the identified round numbers may be compared and the lowest one may be selected. Following the above example, the following tag numbers TID1<0:M>||ITAG1<M+1:N>, TID2<0:M>||ITAG2<M+1:N>, TID3<0:M>||ITAG3<M+1:N> and TID4<0:M>||ITAG4<M+1:N> may be compared and the lowest one may be selected. The instruction thread associated with the selected tag number may be the instruction thread that needs to be executed next.

Figure 3:
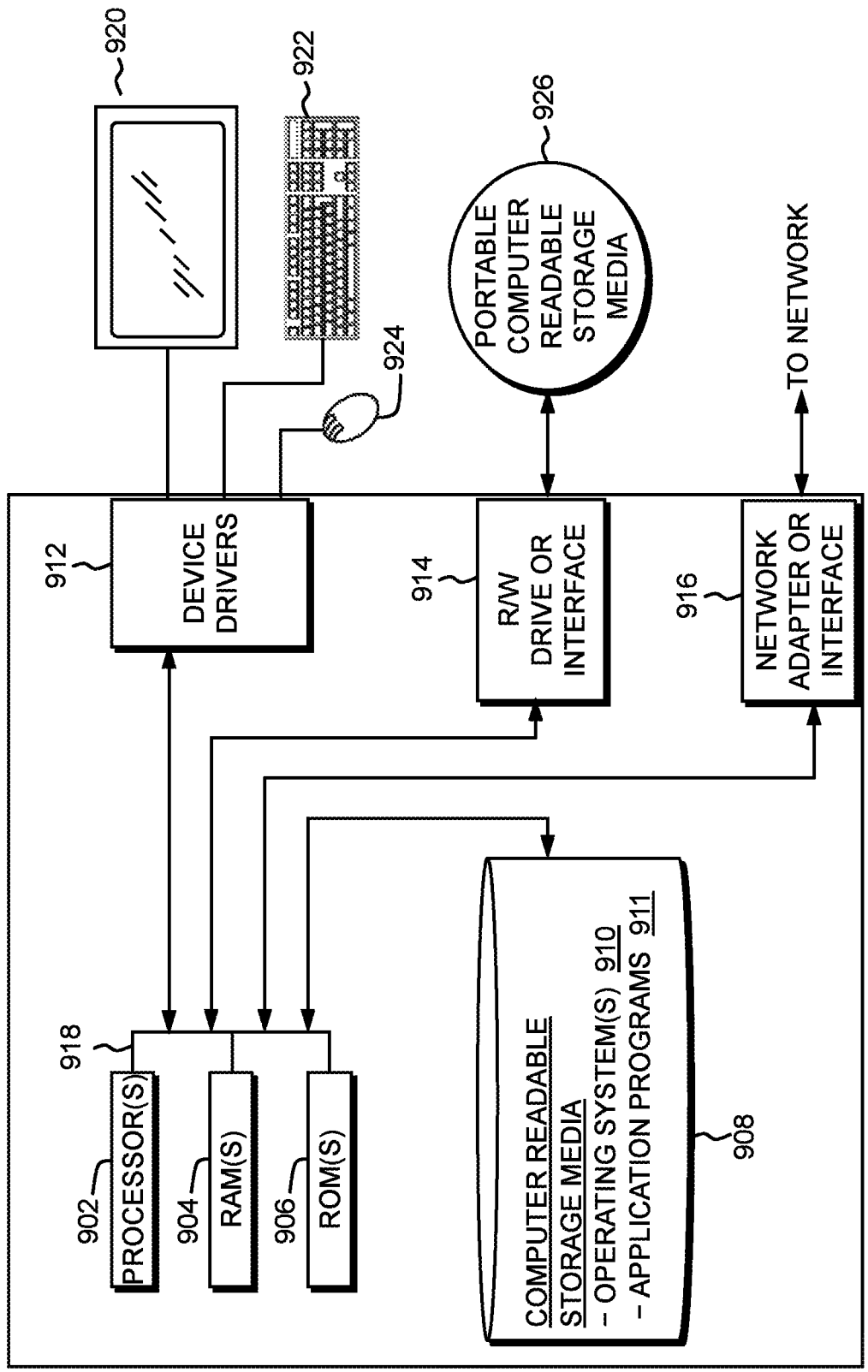
FIG. 3 is a diagram graphically illustrating the hardware components of a multiprocessor system, in accordance with an embodiment of the present disclosure.

FIG. 3 is a block diagram depicting components of a computing device, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

The computing device may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 914 to read from and write to one or more portable computer readable storage media 926. Application programs 911 may be stored on one or more of the portable computer readable storage media 926, read via the respective R/W drive or interface 914 and loaded into the respective computer readable storage media 908.

The computing device may also include a network adapter or interface 916, such as a TCP/IP adapter card or wireless communication adapter (such as a 4G wireless communication adapter using OFDMA technology). Application programs 911 on the computing device may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The computing device may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
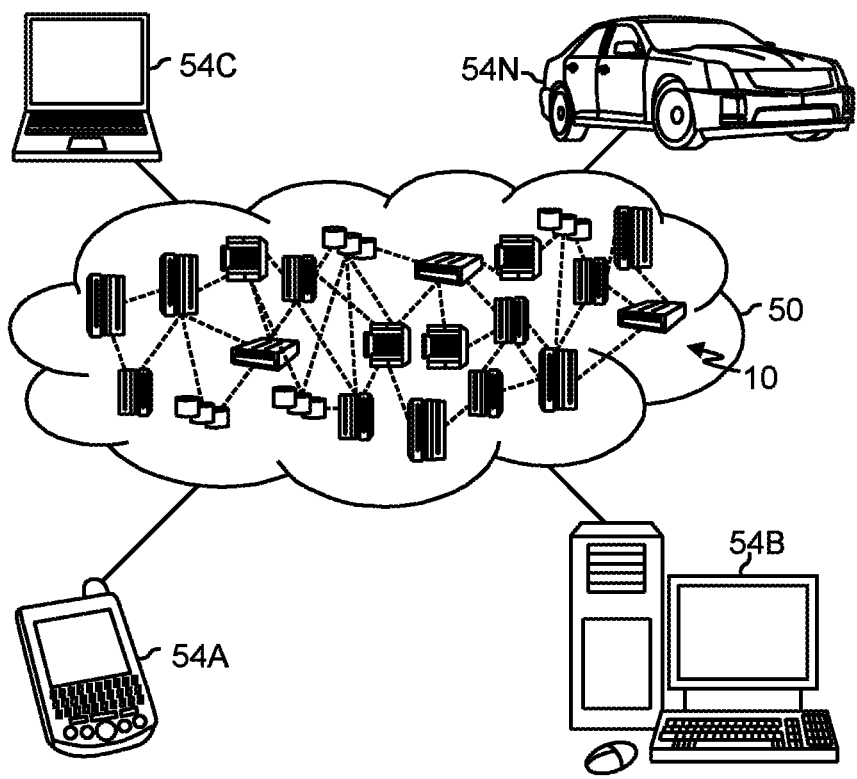
FIG. 4 depicts a cloud computing environment, in accordance with an embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
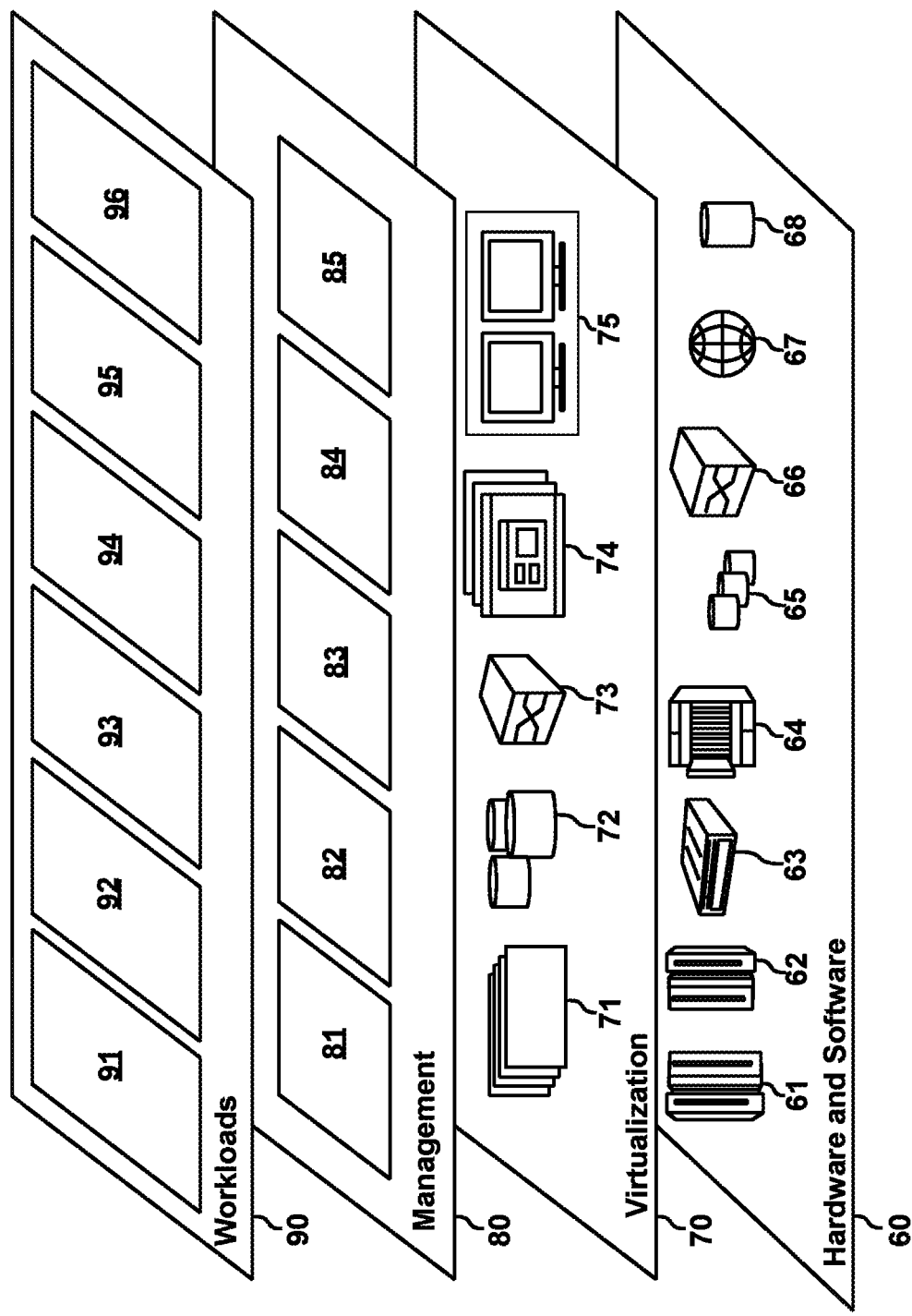
FIG. 5 depicts abstraction model layers of a cloud computing environment, in accordance with an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method to determine an oldest instruction in an instruction queue of a processor with multiple instruction threads, wherein each of the multiple instruction threads have a unique thread identifier, the method comprising:

tagging each instruction thread, of the multiple instruction threads, in the instruction queue with a unique tag number according to a round-robin scheme, wherein the unique tag number includes the unique thread identifier for each instruction thread and a round number in the round-robin scheme;

converting both the unique thread identifier for each instruction thread and the round number based on the round-robin scheme to generate a plurality of converted unique tag numbers;

for each instruction thread, of the multiple instruction threads, selecting the instruction thread with a lowest converted unique tag number of the plurality of converted unique tag numbers from the multiple instruction threads in the instruction queue, wherein the selecting the instruction thread with the lowest converted unique tag number from the multiple instruction threads is executed one clock cycle after the converting the unique thread identifier for each instruction thread;

for each of the multiple instruction threads, determining a next round number to be used in accordance with the round-robin scheme for tagging a new instruction in the instruction queue; and if a value of a most significant bit of the determined next round number is equal to one, changing the value of the most significant bit of each round number of each instruction thread, of the multiple instruction threads, in the instruction queue resulting in updated unique tag numbers, and using the updated unique tag numbers for the selecting, wherein changing the value of the most significant bit of each round number is done by using a correction function, and wherein the correction function makes an absolute value of each round number orderable.

2. The method of claim 1, wherein the unique tag number is a value of a set of bits, and wherein the unique thread identifier is a value of a first subset of bits of the set of bits and the round number is a value of a remaining second subset of bits of the set of bits.

3. The method of claim 2, further comprising:
in response to determining that a priority for each of the multiple instruction threads has changed, updating the unique tag number by changing the value of the first subset of bits in accordance with a current priority for each of the multiple instruction threads for performing the selecting.

4. The method of claim 3, wherein the updating is performed by assigning a lowest absolute value of the first subset of bits to a most prioritized instruction thread.

5. The method of claim 1, further comprising:
using a search algorithm and circuitry to find the oldest instruction for each instruction thread, of the multiple instruction threads, in the instruction queue.

6. A computer program product, comprising a non-transitory tangible storage device having program code embodied therewith, the program code executable by a processor of a computer to perform a method to determine an oldest instruction in an instruction queue of the processor with multiple instruction threads, wherein each of the multiple instruction threads have a unique thread identifier, the method comprising:

tagging each instruction thread, of the multiple instruction threads, in the instruction queue with a unique tag number according to a round-robin scheme, wherein the unique tag number includes the unique thread identifier for each instruction thread and a round number in the round-robin scheme;

converting both the unique thread identifier for each instruction thread and the round number based on the round-robin scheme to generate a plurality of converted unique tag numbers;

for each instruction thread, of the multiple instruction threads, selecting the instruction thread with a lowest converted unique tag number of the plurality of converted unique tag numbers from the multiple instruction threads in the instruction queue, wherein the selecting the instruction thread with the lowest converted unique tag number from the multiple instruction threads is executed one clock cycle after the converting the unique thread identifier for each instruction thread;

for each of the multiple instruction threads, determining a next round number to be used in accordance with the round-robin scheme for tagging a new instruction in the instruction queue; and if a value of a most significant bit of the determined next round number is equal to one, changing the value of the most significant bit of each round number of each instruction thread, of the multiple instruction threads, in the instruction queue resulting in updated unique tag numbers, and using the updated unique tag numbers for the selecting, wherein changing the value of the most significant bit of each round number is done by using a correction function, and wherein the correction function makes an absolute value of the each round number orderable.

7. The computer program product of claim 6, wherein the unique tag number is a value of a set of bits, and wherein the unique thread identifier is a value of a first subset of bits of the set of bits and the round number is a value of a remaining second subset of bits of the set of bits.

8. The computer program product of claim 7, further comprising:
in response to determining that a priority for each of the multiple instruction threads has changed, updating the unique tag number by changing the value of the first subset of bits in accordance with a current priority for each of the multiple instruction threads for performing the selecting.

9. The computer program product of claim 8, wherein the updating is performed by assigning a lowest absolute value of the first subset of bits to a most prioritized instruction thread.

10. The computer program product of claim 6, further comprising:
using a search algorithm and circuitry to find the oldest instruction for each instruction thread, of the multiple instruction threads, in the instruction queue.

11. A computer system, comprising:
one or more computer devices each having one or more processors and one or more tangible storage devices; and a program embodied on at least one of the one or more storage devices, the program having a plurality of program instructions for execution by the one or more processors, the program instructions comprising instructions for determining an oldest instruction in an instruction queue, the processor system enabling multiple instruction threads, wherein the multiple instruction threads have a unique thread identifier, the computer system being configured for:

tagging each instruction thread, of the multiple instruction threads, in the instruction queue with a unique tag number according to a round-robin scheme, wherein the unique tag number includes the unique thread identifier for each instruction thread and a round number in the round-robin scheme;

converting both the unique thread identifier for each instruction thread and the round number based on the round-robin scheme to generate a plurality of converted unique tag numbers;

for each instruction thread, of the multiple instruction threads, selecting the instruction thread with a lowest converted unique tag number of the plurality of converted unique tag numbers from the multiple instruction threads in the instruction queue, wherein the selecting the instruction thread with the lowest converted unique tag number from the multiple instruction threads is executed one clock cycle after the converting the unique thread identifier for each instruction thread;

for each of the multiple instruction threads, determining a next round number to be used in accordance with the round-robin scheme for tagging a new instruction in the instruction queue; and if a value of a most significant bit of the determined next round number is equal to one, changing the value of the most significant bit of each round number of each instruction thread, of the multiple instruction threads, in the instruction queue resulting in updated unique tag numbers, and using the updated unique tag numbers for the selecting, wherein changing the value of the most significant bit of each round number is done by using a correction function, and wherein the correction function makes an absolute value of each round number orderable.

12. The computer system of claim 11, wherein the unique tag number is a value of a set of bits, and wherein the unique thread identifier is a value of a first subset of bits of the set of bits and the round number is a value of a remaining second subset of bits of the set of bits.

13. The computer system of claim 12, further comprising:
in response to determining that a priority for each of the multiple instruction threads has changed, updating the unique tag number by changing the value of the first subset of bits in accordance with a current priority for each of the multiple instruction threads for performing the selecting.

14. The computer system of claim 13, wherein the updating is performed by assigning a lowest absolute value of the first subset of bits to a most prioritized instruction thread.

* * * * *